United States Patent
Morikawa

(10) Patent No.: US 9,937,726 B2
(45) Date of Patent: Apr. 10, 2018

(54) CONTROL DEVICE FOR CONTROLLING PRINTER TO PRINT IMAGE BY EJECTING INK IN A PLURALITY OF COLORS

(71) Applicant: Brother Kogyo Kabushiki Kaisha, Nagoya-shi, Aichi-ken (JP)

(72) Inventor: Shota Morikawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/363,262

(22) Filed: Nov. 29, 2016

(65) Prior Publication Data

US 2017/0157947 A1  Jun. 8, 2017

(30) Foreign Application Priority Data

Dec. 8, 2015  (JP) .................. 2015-239485

(51) Int. Cl.
*B41J 2/21* (2006.01)
*H04N 1/60* (2006.01)

(52) U.S. Cl.
CPC .......... *B41J 2/2103* (2013.01); *H04N 1/6008* (2013.01); *H04N 1/6025* (2013.01); *H04N 1/6091* (2013.01); *H04N 2201/0094* (2013.01)

(58) Field of Classification Search
CPC ... B41J 2/2103; H04N 1/6091; H04N 1/6008; H04N 2201/0094
See application file for complete search history.

(56) References Cited

U.S. PATENT DOCUMENTS 5,909,506 A  *  6/1999  Goto .................. H04N 1/60
                                                              382/162
8,371,670 B2    2/2013  Okazaki
2010/0231630 A1  9/2010  Okazaki

FOREIGN PATENT DOCUMENTS

JP    H04363255 A    12/1992
JP    2010-214727 A   9/2010
JP    2011-143623 A   7/2011

* cited by examiner

*Primary Examiner* — Henok Legesse
(74) *Attorney, Agent, or Firm* — Banner & Witcoff, Ltd.

(57) ABSTRACT

A controller provided in a control device calculates an index value indicative of an amount of a specific type of ink in a specific type of color to be used in printing at least a part of a target image including a first image and a second image. In response to determining that the index value is not greater than a threshold value, the controller controls a printer to print the first image and the second image using the specific type of ink for reproducing the specific type of color. In response to determining that the index value is greater than the threshold value, the controller controls the printer to print the first image using the specific type of ink and to print the second image using a different type of ink different from the specific type of ink for reproducing the specific type of color.

20 Claims, 10 Drawing Sheets

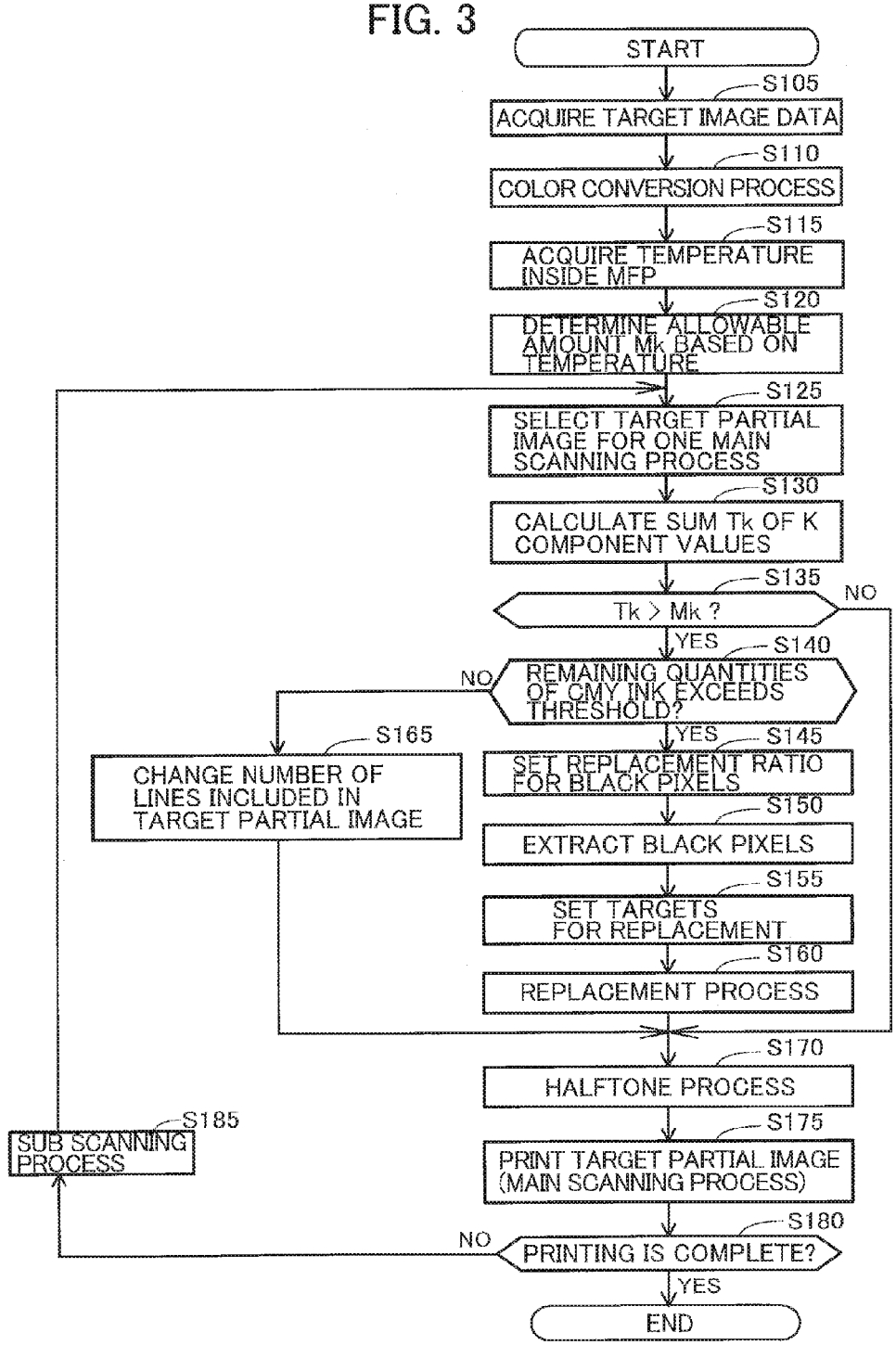

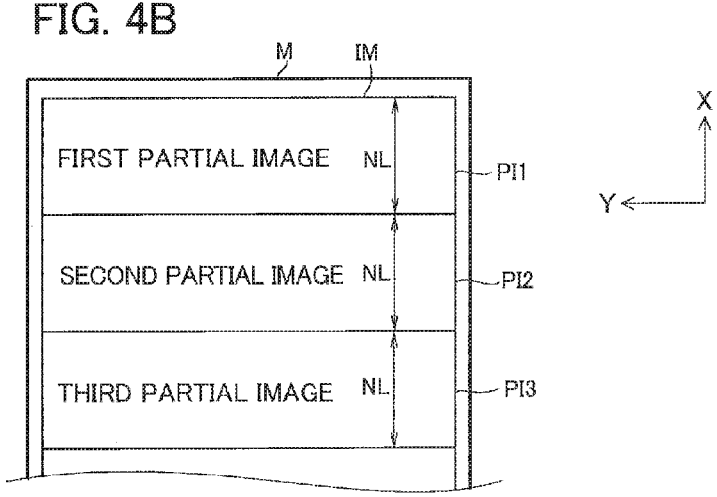

FIG. 5A

| TEMPERATURE | ALLOWABLE AMOUNT |
|---|---|
| T1 | M1 |
| T2 | M2 |
| T3 | M3 |
| T4 | M4 |
| T5 | M5 |

FIG. 5B

| PRIOR TO REPLACEMENT | AFTER REPLACEMENT | | | |
|---|---|---|---|---|
| K | K | C | M | Y |
| 255 | 128 | 100 | 100 | 100 |
| 250 | 125 | 97 | 97 | 97 |
| 245 | 122 | 95 | 95 | 95 |
| 240 | 120 | 92 | 92 | 92 |

FIG. 5C

| PRIOR TO REPLACEMENT | AFTER REPLACEMENT | | | |
|---|---|---|---|---|
| K | K | C | M | Y |
| 255 | 0 | 200 | 200 | 200 |
| 250 | 0 | 192 | 192 | 192 |
| 245 | 0 | 189 | 189 | 189 |
| 240 | 0 | 185 | 185 | 185 |

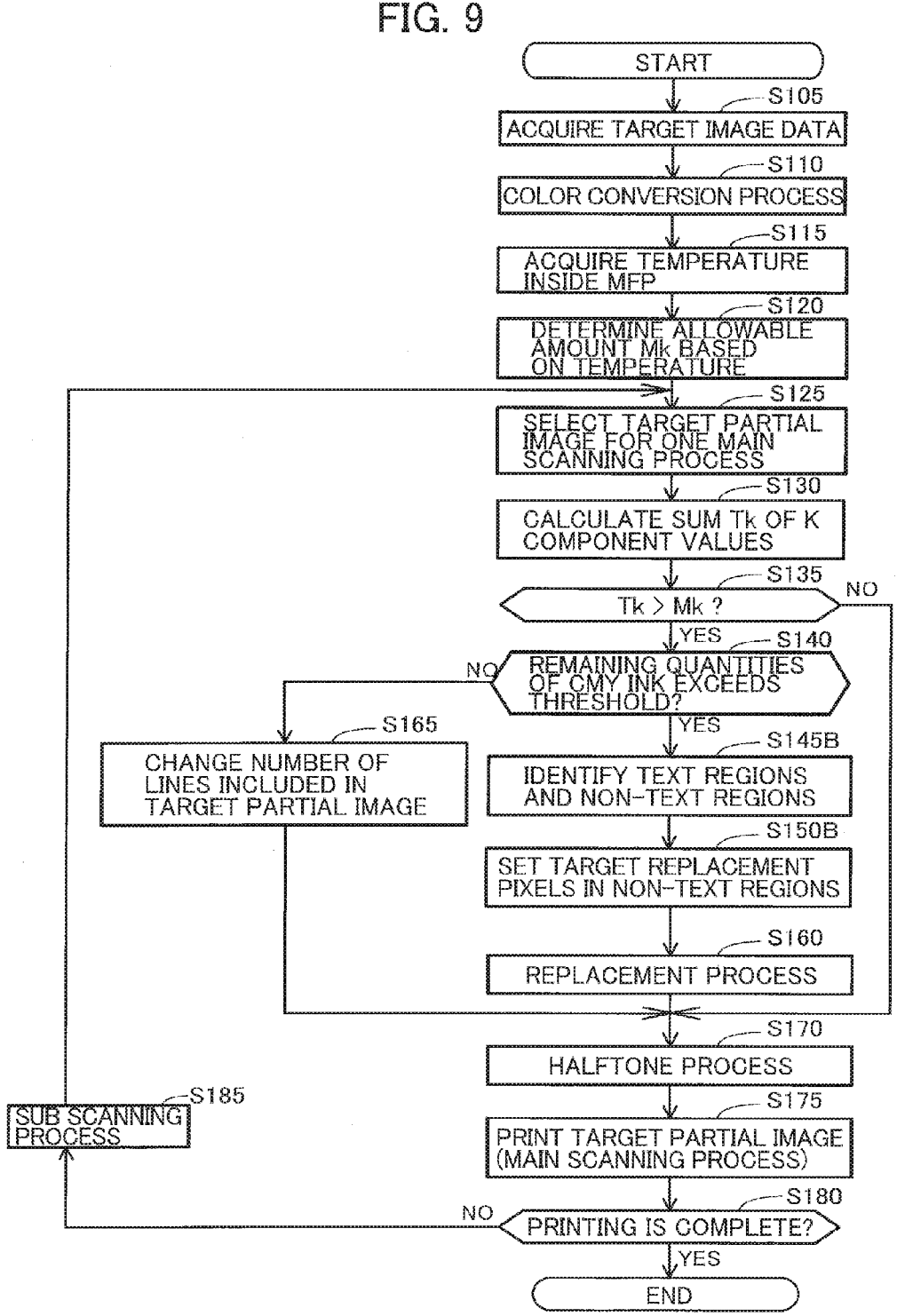

a first process to print the first image and the second image using the specific type of ink but not using a different type of ink different from the specific type of ink for reproducing the specific type of color; and in response to determining that the index value is greater than the threshold value, controlling the printer to perform a second process to print the first image using the specific type of ink but not using the different type of ink for reproducing the specific type of color and to print the second image using the different type of ink for reproducing the specific type of color.

CONTROL DEVICE FOR CONTROLLING PRINTER TO PRINT IMAGE BY EJECTING INK IN A PLURALITY OF COLORS

CROSS REFERENCE TO RELATED APPLICATION

This application claims priority from Japanese Patent Application No. 2015-239485 filed on Dec. 8, 2015. The entire content of the priority application is incorporated herein by reference.

TECHNICAL FIELD

The present disclosure relates to a technology for controlling a printer, and particularly to a technology for controlling the printer to print an image by ejecting ink in a plurality of colors.

BACKGROUND

A printer known in the art includes a print head having pluralities of types of nozzles for ejecting ink in a plurality of colors, such as cyan, magenta, yellow, and black; a plurality of ink accommodating units that accommodates ink in the plurality of colors, such as a plurality of ink cartridges for each color; and an ink delivery unit for supplying ink in the plurality of colors to the print head. In this conventional printer, the viscosity of ink is higher when the temperature of the ink is relatively low, for example. This increased viscosity tends to cause delays in the supply of ink from ink-accommodating units to the print head. Delays in the delivery of ink also occur for a specific type of ink (black ink, for example) when the usage of this specific type of ink per unit time is high. Delays in the delivery of a specific type of ink causes areas of the printed image having the color of the specific type of ink to be lighter, reducing the quality of the printed image.

Japanese Patent Application Publication No. 2010-214727 discloses a technology for reducing the quantity of ink ejected over a specified time period when delays in ink delivery are likely to occur, by temporarily halting the print head outside of the recording region.

SUMMARY

However, while this conventional technology can suppress a decline in image quality caused by delays in ink delivery, the technology also lengthens the printing time.

In view of the foregoing, it is an object of the present disclosure to provide a new technology that can suppress a decline in the quality of a printed image by suppressing delays in ink delivery without increasing printing time.

In order to attain the above and other objects, one aspect provides a control device for controlling a printer. The printer includes a print head. The print head has a plurality of sets of nozzles. Each of the plurality of sets of nozzles is configured to eject ink in one of a plurality of colors. The control device includes a controller. The controller is configured to perform: acquiring target image data representing a target image, the target image including a first image within a first region and a second image within a second region; calculating an index value indicative of an amount of a specific type of ink in a specific type of color to be used in printing at least a part of the target image; determining whether the index value is greater than a threshold value; in response to determining that the index value is not greater than the threshold value, controlling the printer to perform According to another aspect, another aspect provides a non-transitory computer readable storage medium storing a set of program instructions for a control device for controlling a printer. The printer includes a print head. The print head has a plurality of sets of nozzles. Each of the plurality of sets of nozzles is configured to eject ink in one of a plurality of colors. The control device includes a controller. The set of program instructions, when executed by the controller, causes the control device to perform: acquiring target image data representing a target image, the target image including a first image within a first region and a second image within a second region; calculating an index value indicative of an amount of a specific type of ink in a specific type of color to be used in printing at least a part of the target image; determining whether the index value is greater than a threshold value; in response to determining that the index value is not greater than the threshold value, controlling the printer to perform a first process to print the first image and the second image using the specific type of ink but not using a different type of ink different from the specific type of ink for reproducing the specific type of color; and in response to determining that the index value is greater than the threshold value, controlling the printer to perform a second process to print the first image using the specific type of ink but not using the different type of ink for reproducing the specific type of color and to print the second image using the different type of ink for reproducing the specific type of color.

BRIEF DESCRIPTION OF THE DRAWINGS

The particular features and advantages of the disclosure as well as other objects will become apparent from the following description taken in connection with the accompanying drawings, in which:

FIGS. 2A and 2B show overall structure of the MFP, focusing particularly on a print execution unit, in which FIG. 2A shows a structural outline of the overall MFP, and FIG. 2B is a bottom view of a print head;

FIG. 3 is a flowchart illustrating steps in a printing process according to the first embodiment;

FIGS. 4A, 4B, and 4C are explanatory diagrams of CMYK image data, in which FIG. 4A shows a portion of K-component image data and a portion of CMY-component image data before replacement, FIG. 4B is a schematic diagram of a target image to be printed on a sheet, and FIG. 4C shows a portion of K-component image data and a portion of CMY-component image data after replacement;

FIGS. 5A, 5B, and 5C are explanatory diagrams of a table set, in which FIG. 5A shows an example of an allowance table, FIG. 5B shows an example of a first replacement table, and FIG. 5C shows an example of a second replacement table;

FIGS. 8A and 8B are explanatory diagrams illustrating modifications in number of main scan lines, in which FIG. 8A shows a target image printed on a sheet when K ink allowable amount is 10,000, and FIG. 8B shows a target image printed on a sheet using the same target image data as in the example of FIG. 8A when the K ink allowable amount is 5,000;

FIG. 9 is a flowchart illustrating steps in a printing process according to a second embodiment; and FIGS. 10A and 10B each shows an example of a target image, in which FIG. 10A illustrates the target image including a text region and a non-text region, and FIG. 10B illustrates a target partial image including a text region and a non-text region.

DETAILED DESCRIPTION

A. First Embodiment

A-1. Structure of a Multifunction Peripheral

Figure 1:
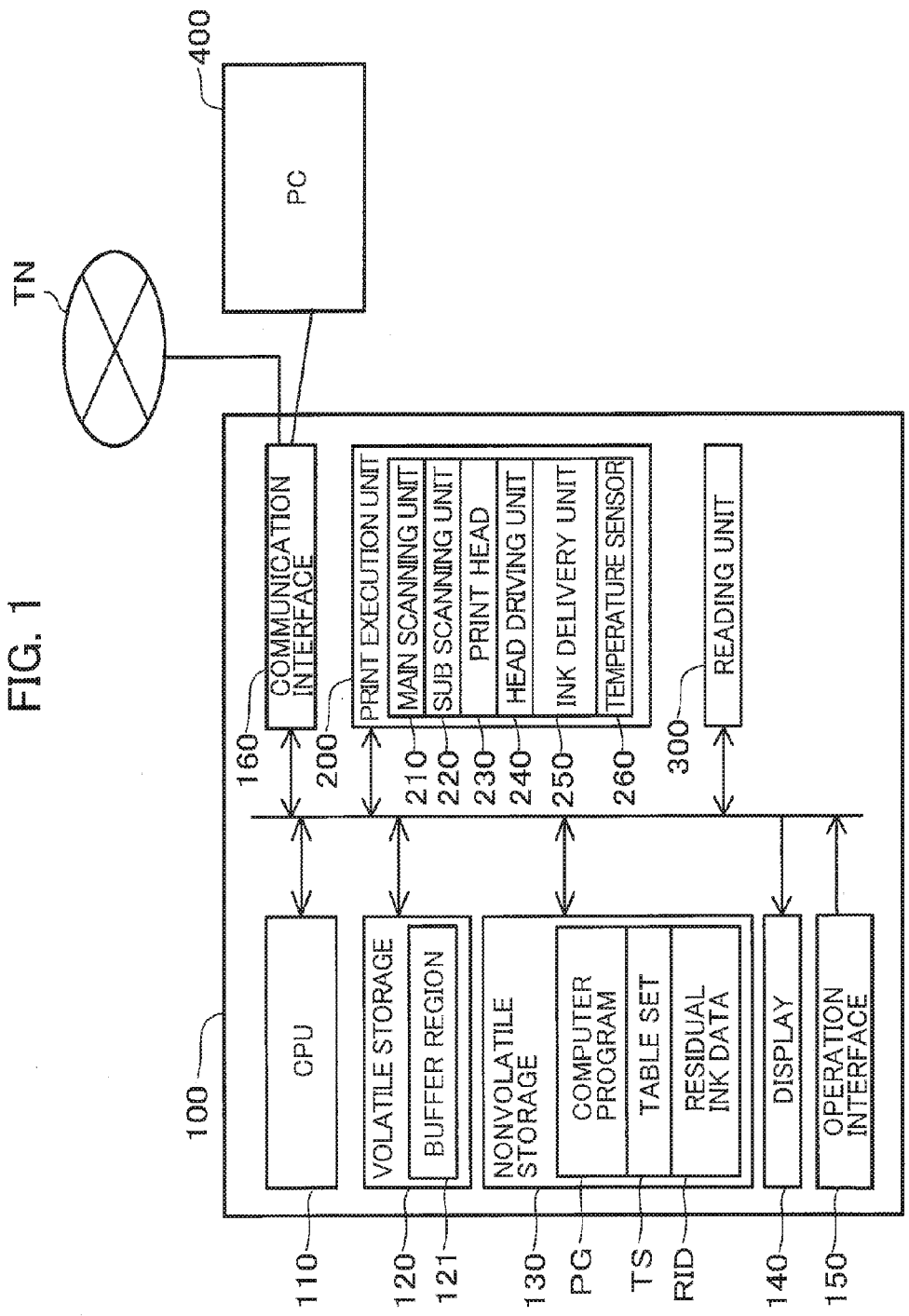
FIG. 1 is a block diagram showing structure of a multi-function peripheral according to a first embodiment.

Next, embodiments of the present disclosure will be described. FIG. 1 is a block diagram showing the structure of a multifunction peripheral (MFP) 100 according to a first embodiment.

The MFP 100 includes a central processing unit (CPU) 110 as an example of the claimed controller that controls the MFP 100; a volatile storage 120, such as DRAM; a non-volatile storage 130, such as flash memory; a display 140, such as a liquid crystal display; an operation interface 150 that includes a touchscreen, buttons, and the like; a communication interface 160; a print execution unit 200; and a reading unit 300.

The volatile storage 120 is used as a buffer region 121 for temporarily storing various intermediate data used by the CPU 110 when the CPU 110 executes a computer program PG.

The nonvolatile storage 130 stores the computer program PG, a table set TS, and residual ink data RID described later. By executing the computer program PG, the CPU 110 can implement various functions for controlling the MFP 100, such as a printing function for controlling the print execution unit 200 to execute a printing operation, a scanning function for controlling the reading unit 300 to generate scan data, and a facsimile function for transmitting and receiving image data over a telephone line. The table set TS includes various tables described later (see FIGS. 5 and 6). The computer program PG and table set TS are recorded in the nonvolatile storage 130 prior to shipping the MFP 100, for example. Alternatively, the computer program PG and table set TS may be recorded on a DVD-ROM or the like, or may be made available for download from a server over a network.

The communication interface 160 includes an interface for connecting to an external device and is used for performing data communications with the external device. For example, the communication interface 160 may include an interface for connecting to a terminal device, such as a personal computer (PC) 400, via a local area network (LAN), and an interface for connecting to an analog telephone network TN.

The reading unit 300 includes an image sensor and acquires scan data by optically reading an original using the image sensor. In the facsimile function, for example, the reading unit 300 is used to generate image data to be transmitted over a telephone line.

The print execution unit 200 is an inkjet-type printing mechanism that prints images by ejecting ink in the colors cyan, magenta, yellow, and black (hereinafter abbreviated as C, M, Y, and K). The print execution unit 200 performs printing by ejecting ink in the CMYK colors to form dots on paper. The print execution unit 200 is an example of the claimed printer. The print execution unit 200 includes a main scanning unit 210, a sub scanning unit 220, a print head 230, a head driving unit 240, an ink delivery unit 250, and a temperature sensor 260.

Figures 2A, 2B:
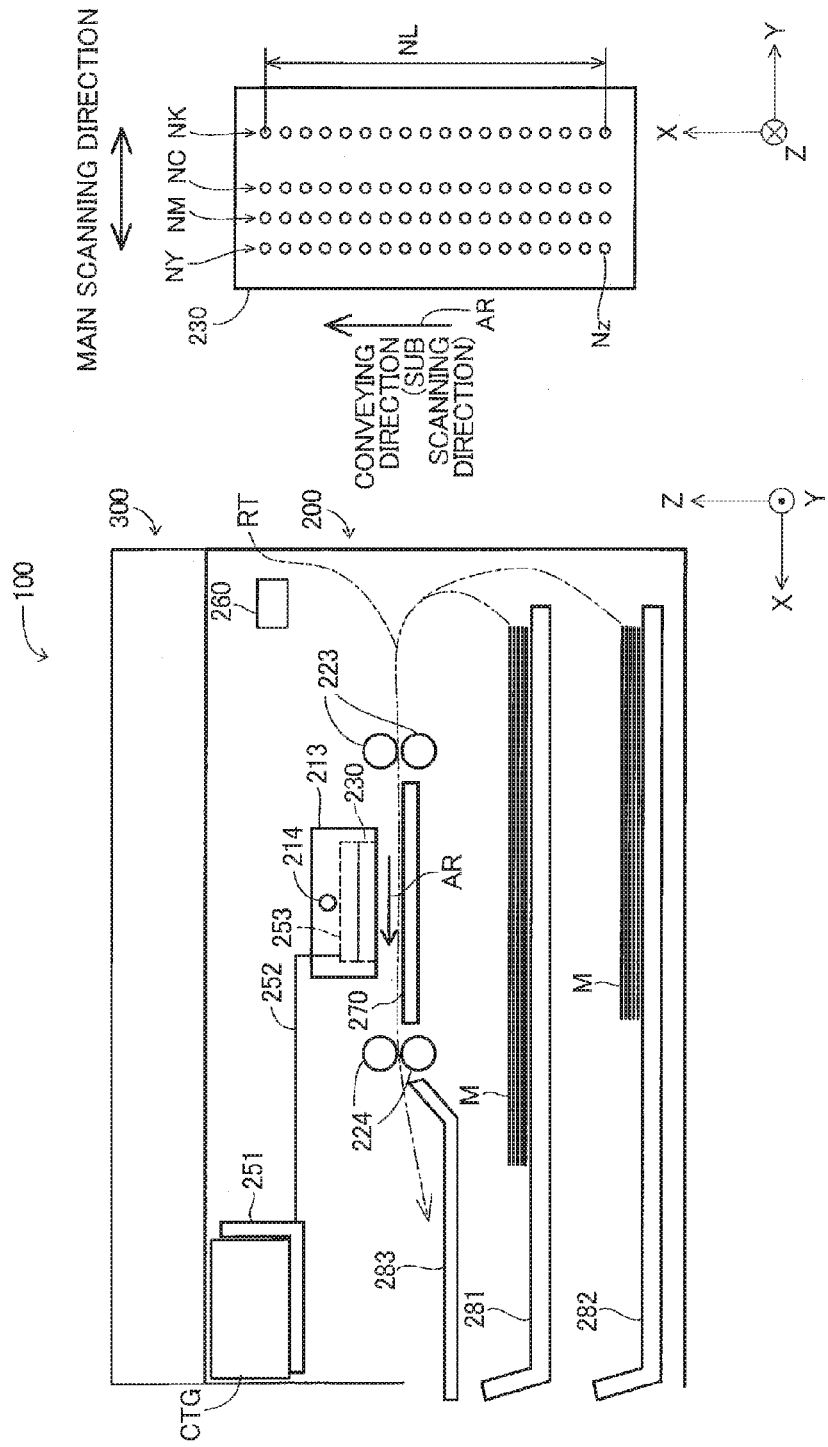

FIGS. 2A and 2B show the overall structure of the MFP 100, focusing particularly on the print execution unit 200. FIG. 2A shows a structural outline of the overall MFP 100. As shown in FIG. 2A, the print execution unit 200 of the MFP 100 is further provided with paper trays 281 and 282 that accommodate sheets M (A4-size paper, for example) as the printing medium; a discharge tray 283 for receiving sheets M discharged after being printed; and a platen 270 disposed in a position for confronting the surface of the print head 230 from which ink is ejected.

The main scanning unit 210 includes a carriage 213 that supports the print head 230, a sliding shaft 214 that retains the carriage 213 while enabling the carriage 213 to move along the main scanning direction (the direction of the Y-axis in FIGS. 2A and 2B); and a main scanning motor (not shown). The main scanning unit 210 uses the drive force outputted from the main scanning motor to reciprocate the carriage 213 along the sliding shaft 214. This operation implements a main scan for reciprocating the carriage 213 relative to a sheet M or other printing medium along the main scanning direction. The main scanning unit 210 is an example of the claimed main scanner.

The sub scanning unit 220 is provided with a plurality of conveying rollers, and a sub scanning motor (not shown). The conveying rollers include a pair of upstream rollers 223 disposed on the upstream side of the platen 270, and a pair of downstream rollers 224 disposed on the downstream side of the platen 270. The sub scanning unit 220 uses the drive force outputted from the sub scanning motor to convey sheets M from the paper trays 281 and 282 along a conveying path RT that passes over the platen 270 and leads to the discharge tray 283. This operation implements a sub scan for moving the printing medium relative to the print head 230 in a sub scanning direction that intersects the main scanning direction. The arrow AR in FIGS. 2A and 2B denotes the sub scanning direction described above, that is, the direction in which the sheets M are conveyed over the platen 270 (the +X direction, i.e., the positive direction on the X-axis in FIGS. 2A and 2B). The sub scanning unit 220 is an example of the claimed sub scanner.

The ink delivery unit 250 delivers ink in the plurality of colors to the print head 230. The ink delivery unit 250 is an example of the claimed ink supply. The ink delivery unit 250 includes a cartridge-mounting unit 251, a tube 252, and a buffer tank 253. An ink cartridge CTG is detachably mounted in the cartridge-mounting unit 251. The ink cartridge CTG is a container that accommodates ink to be supplied to the print head 230. The buffer tank 253 is disposed in the carriage 213 above the print head 230. The buffer tank 253 temporarily accommodates ink to be delivered to the print head 230. The tube 252 is an ink channel that connects the cartridge-mounting unit 251 to the buffer tank 253. Ink in the ink cartridge CTG is supplied to the print head 230 via the cartridge-mounting unit 251, tube 252, and buffer tank 253. For simplicity, only one each of the ink cartridge CTG, cartridge-mounting unit 251, tube 252, and buffer tank 253 is shown in FIG. 2, but these components are provided for each type of ink that the print head 230 can eject, and specifically for each of the CMYK colors of ink in this example.

FIG. 2B is a bottom view of the print head 230, i.e., a view of the print head 230 from the −Z side. The print head 230 has a plurality of nozzles Nz for ejecting ink in the plurality of colors. Specifically, as shown in FIG. 2B, nozzle rows NC, NM, NY, and NK are formed in the surface of the print head 230 that confronts the platen 270 (the −Z side surface of the print head 230) for ejecting ink in the colors C, M, Y, and K, respectively. Each of the nozzle rows includes a plurality of nozzles Nz aligned in the sub scanning direction. The length of the nozzle rows in the sub scanning direction will be called a nozzle length NL. The nozzle rows NC, NM, NY, and NK for respectively ejecting CMYK ink are arranged relative to each other in a prescribed order along the main scanning direction. In the present embodiment, the nozzle rows are arranged in order of the colors K, C, M, and Y from the +Y side toward the −Y side, as shown in FIG. 2B.

The nozzles Nz are connected to the buffer tanks 253 via ink channels (not shown) formed in the print head 230. Actuators (not shown) for ejecting ink are provided along each of the ink channels formed in the print head 230.

The head driving unit 240 drives each of the actuators in the print head 230 based on print data supplied from the CPU 110 while the main scanning unit 210 performs a main scan. Through the driving action of the head driving unit 240, the print head 230 ejects ink onto the printing medium moved by the sub scanning unit 220. The ejected ink forms dots on the printing medium.

The CPU 110 controls the main scanning unit 210, sub scanning unit 220, and head driving unit 240 of the print execution unit 200 to perform a printing operation by repeatedly executing a set of processes that includes a single main scanning process (also called a "pass"), and a single sub scanning process. In a single main scanning process, the head driving unit 240 drives the print head 230 while the main scanning unit 210 executes a one main scan. During this time, the sub scanning unit 220 halts conveyance of the sheet M. Through this process, the print execution unit 200 prints a partial image constituting part of the overall image being printed. In a single sub scanning process, the sub scanning unit 220 conveys the sheet M a specified feed amount.

When ink is ejected from a nozzle Nz, the ink remaining in the buffer tank 253 is reduced by the amount that was ejected, generating negative pressure in the buffer tank 253. The negative pressure causes ink in the corresponding ink cartridge CTG to be delivered to the buffer tank 253 via the corresponding cartridge-mounting unit 251 and tube 252. If ink of a specific color among the CMYK colors, such as the black ink (hereinafter called the "K ink"), is ejected in a large amount from a plurality of nozzles Nz within a short amount of time during printing, there may occur a delay in the delivery of ink in the specific color to the corresponding buffer tank 253. Ejection problems may occur due to this delay in the supply of ink. For example, ink of the specific color may fail to be ejected from the nozzles Nz, even when the actuator is driven, or the amount of ejected ink may be smaller than expected. The occurrence of these problems may result in the specific color appearing lighter in the printed image, reducing the quality of the image. This delay in the supply of ink is more likely to occur when the fluidity of the ink is lower. For example, the viscosity of ink increases when the temperature in the MFP 100 (and specifically the temperature of the print execution unit 200) drops too much. An increase in viscosity reduces the fluidity of the ink, giving rise to delays in the supply of ink. From this description, it is clear that delays in ink supply are more likely to occur when the temperature in the MFP 100 is less than or equal to a reference temperature, and when the amount of ink in the specific color ejected (i.e., the amount of dots formed) within a unit time period is greater than or equal to a reference amount.

The residual ink data RID in FIG. 1 specifies the residual quantities of ink in each of the CMYK colors used by the print execution unit 200. The CPU 110 manages the residual quantity of each ink color using the residual ink data RID. For example, the CPU 110 detects that an ink cartridge CTG has been replaced by detecting the ink cartridge CTG being removed from the cartridge-mounting unit 251 and an ink cartridge CTG being mounted back in the cartridge-mounting unit 251. The CPU 110 counts the cumulative usage of ink in each color from the time each ink cartridge CTG was replaced based on print data, for example, and calculates the residual quantity of ink in each color by subtracting these cumulative usage quantities from initial values for the capacity of ink in the ink cartridges CTG. The CPU 110 calculates the residual quantity of ink in each color after every printing operation, and updates the residual ink data RID. As a variation, sensors may be provided for detecting the residual quantities of ink in the ink cartridges CTG, and the CPU 110 may detect the residual quantities of ink using these sensors.

A-2. Printing Process

Next, a printing process according to the first embodiment will be described with reference to the flowchart in FIG. 3. The printing process is executed by the CPU 110 to control the print execution unit 200 to print a target image based on target image data. In this example, the CPU 110 executes a printing process for printing a monochrome image represented by facsimile data. The printing process begins when the communication interface 160 receives facsimile data via a telephone line. A monochrome image is rendered in black only. Hence, when the monochrome image includes solid (filled) regions, for example, there is a high likelihood that a large amount of K ink will be ejected within a unit time when printing the monochrome image, resulting in the delays in ink delivery described above. The printing process of the present embodiment is configured to suppress such occurrences of delays in ink delivery in order to suppress a decline in the quality of the printed image.

In S105 the CPU 110 acquires the facsimile data received by the communication interface 160 as target image data representing a target image to be printed. The facsimile data may be data compressed according to the Group 3 fax format or the like.

In S110 the CPU 110 executes a color conversion process on the target image data to generate CMYK image data. Specifically, the CPU 110 decompresses the compressed target image data and acquires binary image data representing the target image as ON pixels and OFF pixels. For example, this binary image data may represent an A4-size original with a pixel number equivalent to 200 (vertical) dpi×200 (horizontal) dpi. The CPU 110 converts this binary image data to RGB image data representing the color of each pixel in RGB values. Next, the CPU 110 converts the RGB image data to CMYK image data representing the color of each pixel in CMYK values using a look-up table that defines correlations between RGB values and CMYK values. The CMYK values are color values that include gradation values (values selected from one of 256 gradations, for example) specifying the densities of the four CMYK color components corresponding to the four ink colors used in the print execution unit 200.

FIGS. 4A, 4B, and 4C are explanatory diagrams of the CMYK image data. The CMYK image data generated in S110 includes component image data for each of the CMYK color components. FIG. 4A shows a portion of K-component image data, and a portion of CMY-component image data. In the color conversion process, the original values for ON pixels in the binary image data are converted to the CMYK values representing black (0, 0, 0, 255), while values for OFF pixels are converted to CMYK values representing white (0, 0, 0, 0). Consequently, the value of each pixel in the K-component image data is set to either 255 or 0. Since the K-component image data in the example of FIG. 4A represents a solid region, all pixels in FIG. 4A have been set to 255. The value for each pixel in the CMY-component image data is set to 0, as illustrated in FIG. 4A.

In S115 the CPU 110 acquires a temperature Td inside the MFP 100 using the temperature sensor 260 to detect the internal temperature.

In S120 the CPU 110 sets a K ink allowable amount Mk based on the temperature Td acquired in S115. Specifically, the K ink allowable amount Mk is determined by referencing an allowance table AT included in the table set TS (see FIG. 1).

FIGS. 5A, 5B, and 5C are explanatory diagrams of the table set TS. FIG. 5A shows an example of the allowance table AT. The allowance table AT correlates K ink allowable amounts M1-M5 with a plurality of temperatures T1-T5. The allowable amount M1 corresponding to the temperature T1 denotes the upper limit for the ejection amount of K ink allowed in a single main scanning process when the temperature in the MFP 100 is temperature T1. The values used for the K ink allowable amounts M1-M5 in the present embodiment are converted to the sum of gradation values indicating the density of the K component. For example, the manufacturer of the MFP 100 may determine through experimentation the upper limit of the number of dots that can be formed in K ink in a single main scanning process under the ambient temperature T1 without delays occurring in the delivery of K ink. Subsequently, the manufacturer of the MFP 100 sets the allowable amount M1 corresponding to the temperature T1 by multiplying the upper limit of the number of dots found through experimentation by the corresponding density of one dot (255, for example). The allowance table AT stores correlations between the preset temperature T1-T5 and the K ink allowable amounts M1-M5 found above.

The CPU 110 sets the K ink allowable amount Mk corresponding to the temperature Td in the MFP 100 through interpolation using the plurality of temperatures and corresponding allowable amounts recorded in the allowance table AT, for example.

In S125 the CPU 110 selects a partial image PI for one main scanning process from a target image IM specified by the target image data produced in the color conversion process (CMYK image data) and sets this partial image PI as a target partial image. FIG. 4B is a schematic diagram of the target image IM to be printed on a sheet M. As shown in FIG. 4B, the target image IM is divided into a plurality of partial images PI and printed in a plurality of main scanning processes. The partial image PI selected as the target partial image has the maximum size that can be printed in a main scanning process. More specifically, the width of the partial image PI in the conveying direction, i.e., the dimension of the partial image PI in the X-direction of FIG. 4B, is equivalent to the nozzle length NL. The first time that the CPU 110 executes the process of S125 in this example, the CPU 110 selects a partial image PI1 for the first main scanning process. The partial image PI1 extends in the conveying direction from the downstream edge of the target image IM (the edge on the +X side in FIG. 4B) a distance equivalent to the nozzle length NL. The k-th time that the CPU 110 performs the process in S125 (where k is an integer of 2 or greater), the CPU 110 selects a partial image Pik equivalent in dimension to the nozzle length NL and positioned adjacent to and on the −X side of the partial image PI(k−1) that was printed in the (k−1)-th main scanning process (in S175 described later).

In S130 the CPU 110 calculates a sum Tk of K component values in the target partial image based on the partial image data representing the target partial image. Specifically, the CPU 110 calculates the sum Tk by adding the K component values for all pixels in the partial image data representing the target partial image.

In S135 the CPU 110 determines whether the sum Tk calculated in S130 is greater than the K ink allowable amount Mk calculated in S120. If the sum Tk is greater than the K ink allowable amount Mk, there is a relatively high probability that the delivery of K ink will be delayed if the CPU 110 were to print the target partial image without performing the process described below in S140-S165. If the sum Tk is less than or equal to the K ink allowable amount Mk, there is a relatively low probability that a delay will occur in the delivery of K ink, even if the CPU 110 were to print the target partial image without performing the process in S140-S165 described below.

Thus, when the sum Tk is less than or equal to the K ink allowable amount Mk (S135: NO), the CPU 110 advances to S170 without performing the process in S140-S165. When the sum Tk is greater than the K ink allowable amount Mk (S135: YES), the CPU 110 advances to S140.

In S140 the CPU 110 determines whether the remaining quantities of ink for all of the CMY colors are greater than or equal to a prescribed threshold TH. As described above, the residual quantity of ink in each color is recorded in the residual ink data RID.

If the residual quantities of ink in all of the CMY colors exceeds the threshold TH (S140: YES), in S145 the CPU 110 sets a replacement ratio for black pixels. More specifically, the CPU 110 references a replacement ratio determination table RDT included in the table set TS to set a first replacement ratio RR1 and a second replacement ratio RR2. The first replacement ratio RR1 specifies the percentage of black pixels in the partial image PI currently being processed that will be subjected to a first replacement process. The second replacement ratio RR2 specifies the percentage of black pixels in the partial image PI that will be subjected to a second replacement process. The definition of a black pixel in the first and second replacement processes will be provided later.

Figure 6:
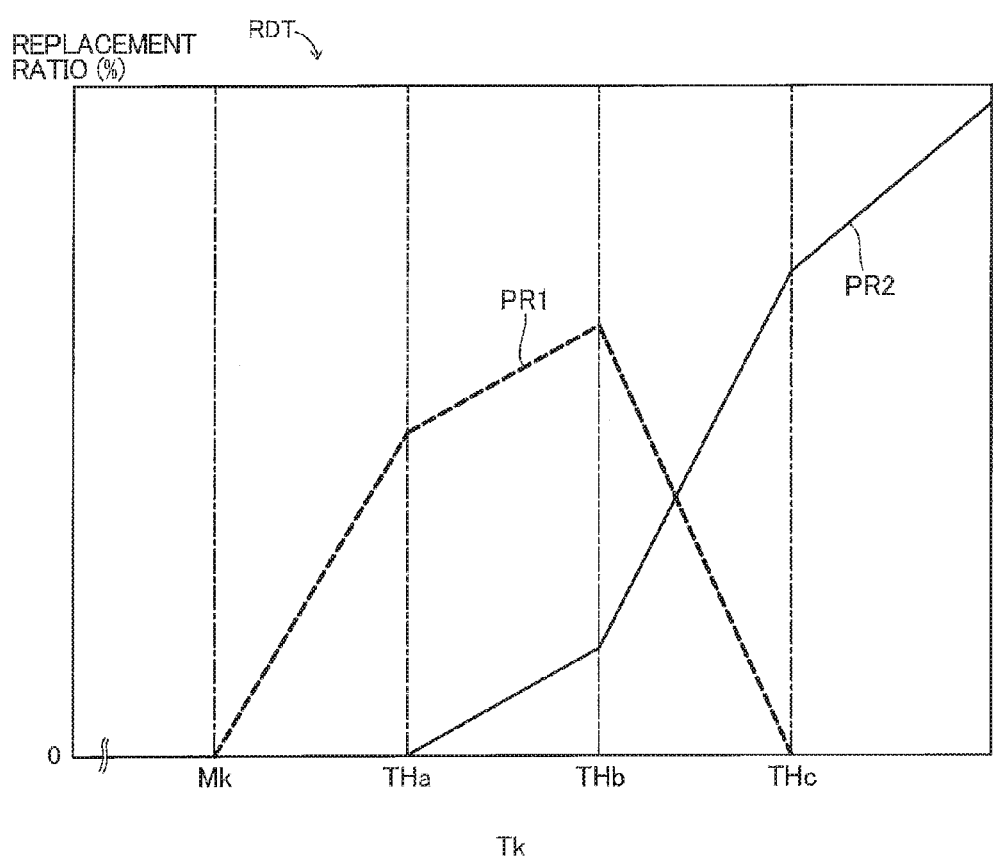
FIG. 6 conceptually illustrates an example of a replacement ratio determination table.

FIG. 6 conceptually illustrates an example of the replacement ratio determination table RDT in the form of a graph. As in the example of FIG. 6, the replacement ratio determination table RDT is a table that specifies correlations between the sum Tk and the first replacement ratio RR1 and correlations between the sum Tk and the second replacement ratio RR2. These correlations are defined using the four thresholds Mk, THa, THb, and THc, where Mk is the K ink allowable amount Mk. Here, the threshold THa is set greater than the K ink allowable amount Mk, the threshold THb greater than the threshold THa, and the threshold THc greater than the threshold THb (Mk<THa<THb<THc).

As shown in FIG. 6, at least one of the first replacement ratio RR1 and second replacement ratio RR2 is set to a value greater than 0 within the range of sums Tk greater than the K ink allowable amount Mk. When the sum Tk is within a first range greater than the K ink allowable amount Mk but less than or equal to the threshold THa (Mk<Tk≤THa), the first replacement ratio RR1 increases linearly at a prescribed rate of increase (slope) as the sum Tk increases. In the first range, the second replacement ratio RR2 is 0. In a second range in which the sum Tk is greater than the threshold THa but less than or equal to the threshold THb (THa<Tk≤THb), the first replacement ratio RR1 increases linearly as the sum Tk increases, but at a lower rate than the rate of increase in the first range. In the second range, the second replacement ratio RR2 increases linearly at a prescribed rate of increase as the sum Tk increases. In a third range in which the sum Tk is greater than the threshold THb but less than or equal to the threshold THc (THb<Tk THc), the first replacement ratio RR1 decreases linearly as the sum Tk increases and reaches 0 at Tk=THc. In the third range, the second replacement ratio RR2 increases linearly as the sum Tk increases, but at a higher rate than the rate of increase in the second range. In a fourth range in which the sum Tk is greater than the threshold THc (THc<Tk), the first replacement ratio RR1 is 0, and the second replacement ratio RR2 increases linearly at a lower rate than the rate of increase in the third range.

The first replacement ratio RR1 and second replacement ratio RR2 are set such that the sum Tk of K component values is reduced to a value less than or equal to the K ink allowable amount Mk in partial image data representing a partial image PI after the data is subjected to a replacement process described later in S160.

In S150 the CPU 110 extracts a plurality of black pixels from among the plurality of pixels in the target partial image based on the partial image data representing the target partial image, and sets these black pixels as candidates for replacement. In the present embodiment, black pixels are considered pixels whose K component value is at least a prescribed reference value, such as 240. Since the K component value in the target image data of the present embodiment is either 255 or 0, as described above, in S150 the CPU 110 extracts pixels whose K component value is 255 as black pixels. In the example shown in FIG. 4A, the CPU 110 extracts all pixels as black pixels since the K component of all pixels is 255.

In S155 the CPU 110 sets a plurality of pixels from among the plurality of black pixels extracted in S150 as targets for replacement. More specifically, the CPU 110 sets a number PN1 of first target pixels P1 to be subjected to the first replacement process based on the first replacement ratio RR1, and sets a number PN2 of second target pixels P2 to be subjected to the second replacement process based on the second replacement ratio RR2. The numbers PN1 and PN2 are set to the product of the total number $PN_{total}$ of pixels in the target partial image and the respective first replacement ratio RR1 and second replacement ratio RR2 (PN1=$PN_{total}$× RR1 and PN2=$PN_{total}$×RR2). The CPU 110 selects PN1 first target pixels P1 and PN2 second target pixels P2 from the plurality of black pixels extracted in S150. These pixels P1 and P2 are set so as to be distributed evenly throughout the target partial image. For example, the PN1 first target pixels P1 are selected randomly according to random number selection from the plurality of black pixels extracted in S150, and the PN2 second target pixels P2 are selected randomly according to random number selection from among the remaining black pixels. In the example of FIG. 4A, pixels with a bold border denote first target pixels P1, while pixels with hatching denote second target pixels P2.

In S160 the CPU 110 executes a replacement process for replacing the values of the selected pixels. That is, the CPU 110 performs the first replacement process to replace the CMYK values of the PN1 first target pixels P1 and the second replacement process to replace the CMYK values of the PN2 second target pixels P2. The first replacement process is executed using a first replacement table RT1 shown in FIG. 5B, and the second replacement process is executed using a second replacement table RT2 shown in FIG. 5C. Each of the replacement tables RT1 and RT2 specifies correlations between K component values prior to replacement and CMYK component values after replacement for pre-replacement K component values within the range from 240 to 255, i.e., the range of K component values that black pixels may possess.

In the first replacement process, the K component value is replaced with a value approximately half the original value. In the second replacement process, the K component value is replaced with 0. To compensate for this reduction in the K component value, the pre-replacement values (0 in the present embodiment) of each of the CMY components is replaced with the corresponding values specified in the replacement tables RT1 and RT2 in the corresponding first and second replacement processes. Each of the CMY values is replaced with the same value, enabling the CMY components to render an achromatic color.

As a result of the first replacement process described above, the CMYK values in the first target pixels P1 that render black with only the K component are replaced with CMYK values that render black using the four CMYK color components. Further, the second replacement process converts CMYK values in the second target pixels P2 that render black with only the K component to CMYK values that render black using only the three CMY color components and not the K component. As a result, the black color represented by CMYK values prior to conversion is essentially the same as the color represented by CMYK values after conversion.

On the other hand, if the residual quantity of ink in even one of the CMY colors is less than the prescribed threshold TH (S140: NO), the CPU 110 executes the process in S165 rather than the process in S145-S160 described above.

In S165 the CPU 110 changes the number of main scan lines included in the target partial image so that the sum Tk of K component values in the target partial image is within the K ink allowable amount Mk. A main scan line is a line in the target image IM and partial image PI configured of a plurality of pixels aligned in a direction corresponding to the main scanning direction used during the printing process (the Y-direction in FIG. 4B). As described above, the target partial image has a dimension in the X-direction equivalent to the nozzle length NL. In other words, the number of main scan lines in a target partial image is the number of lines having a width in the X-direction equivalent to the nozzle length NL.

Figure 7:
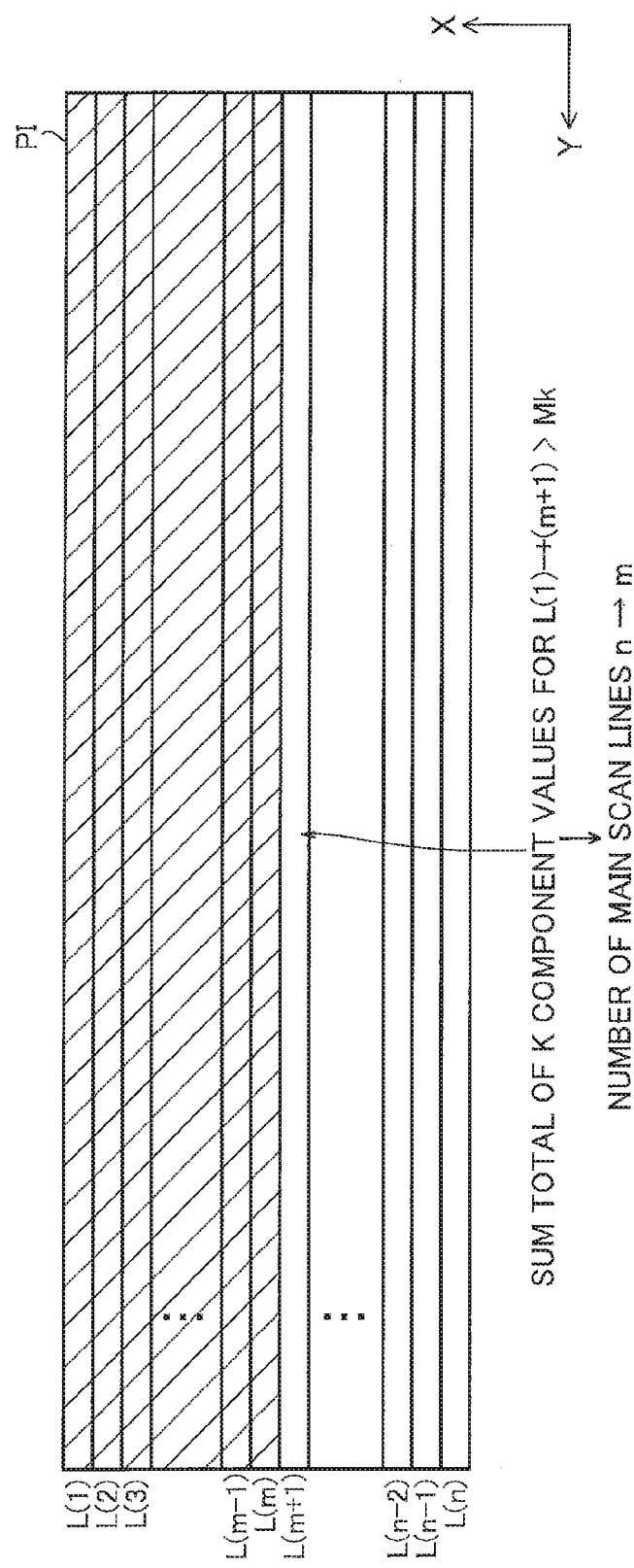
FIG. 7 conceptually illustrates a partial image.

FIG. 7 conceptually illustrates a partial image PI. The partial image PI shown in FIG. 7 includes n main scan lines L(1)-L(n), where n denotes the number of main scan lines having a width in the X-direction equivalent to the nozzle length NL. The numbers 1-n in the n main scan lines L(1)-L(n) are assigned to the main scan lines in order beginning from the line positioned on the downstream edge of the partial image PI in the conveying direction (the +X side edge in FIG. 7). For example, the CPU 110 selects the n main scan lines L(1)-L(n) one at a time in this order to be a target line. The CPU 110 calculates the sum of the K component values for the plurality of pixels included in the target line. Next, the CPU 110 sequentially calculates the sum total of K component values from the first main scan line to the current target line. The CPU 110 continues performing these calculations while sequentially changing the target line until the sum total of K component values becomes greater than the K ink allowable amount Mk. As an example, let us say that the sum total of K component values for the main scan lines L(1)-L(m) is smaller than the K ink allowable amount Mk, while the sum total of K component values for the main scan lines L(1)-L(m+1) is greater than the K ink allowable amount Mk (where m is an integer greater than or equal to 1 but smaller than n). In this case, the CPU 110 halts calculations upon determining that the sum total of K component values in the main scan lines L(1)-L(m+1) is greater than the K ink allowable amount Mk, and changes the number of main scan lines in the target partial image from n to m. Hence, the CPU 110 modifies the target partial image from a partial image including the n main scan lines L(1)-L(n) to a partial image that includes the m main scan lines L(1)-L(m) in order that the sum Tk of K component values in the target partial image is less than or equal to the K ink allowable amount Mk. In this example, when the CPU 110 returns to S125 to select the next target partial image, the CPU 110 selects a partial image having a width equivalent to the nozzle length NL whose first main scan line (i.e., main scan line positioned on the +X-side edge) is the main scan line L(m+1).

In S170 the CPU 110 executes a halftone process on the partial image data (CMYK image data) representing the target partial image. For example, the CPU 110 adjusts the number of pixels in the partial image data according to the printing resolution (300 (vertical) dpi×300 (horizontal) dpi, for example). After adjusting the number of pixels, the CPU 110 converts the CMYK image data to dot data using a well-known technique, such as the dither method or the error diffusion method. The dot data represents the dot formation state for each of the CMYK color components of each pixel. The dot formation state in the dot data represented by the color component value of each pixel may be one of the states "dot" or "no dot," for example. Alternatively, the dot formations states may include the four states "large dot," "medium dot," "small dot," and "no dot."

In S175 the CPU 110 controls the print execution unit 200 using the dot data generated in S170 to execute one main scanning process, whereby the print execution unit 200 prints the target partial image.

If the process in S145-S160 was not performed, only the K component values in the CMYK image data representing the target partial image are greater than 0, while all other CMY component values are 0 (see FIG. 4A). Consequently, the print execution unit 200 prints the target partial image using only K ink and not CMY ink.

However, when the process in S145-S160 was performed, the CMY component values are greater than 0 in the first and second target pixels P1 and P2 of the CMYK image data representing the target partial image (see FIG. 4C). Accordingly, the print execution unit 200 prints regions of the target partial image corresponding to the first and second target pixels P1 and P2 using CMY ink to render black. More specifically, since the K component values in the first target pixels P1 are greater than 0 (see FIG. 4C), the print execution unit 200 prints regions corresponding to the first target pixels P1 using CMYK ink. Further, since the K component values in the second target pixels P2 are 0 (see FIG. 4C), the print execution unit 200 prints regions corresponding to the second target pixels P2 with CMY ink and not K ink.

Also, when the process in S145-S160 has been performed, the K component values in pixels other than the first and second target pixels P1 and P2 are greater than 0, while the CMY component values are all 0. Consequently, regions of the target partial image corresponding to pixels other than the first and second target pixels P1 and P2 are printed using K ink and not CMY ink.

In S180 the CPU 110 determines whether the entire target image has been printed. If printing is not complete (S180: NO), in S185 the CPU 110 controls the print execution unit 200 to execute a single sub scanning process to convey the sheet M a prescribed distance in the conveying direction. After completing the sub scanning process, the CPU 110 returns to S125 and selects the next target partial image.

When printing a partial image PI in the embodiment described above, the CPU 110 does not execute the process in S145-S160 of FIG. 3 when there is a relatively low probability of a delay occurring in the delivery of K ink from the ink delivery unit 250 to the print head 230, and specifically when the sum Tk of K component values in the partial image PI is less than or equal to the K ink allowable amount Mk set based on the temperature Td in the MFP 100 (S135: NO). In this case, the CPU 110 prints the partial image PI using K ink and not CMY ink.

On the other hand, when there is a relatively high probability of a delay occurring in the delivery of K ink from the ink delivery unit 250 to the print head 230, and specifically when the sum Tk is greater than the K ink allowable amount Mk (S135: YES), the CPU 110 executes the process in S145-S160 of FIG. 3 described above on the condition that the remaining quantities of CMY ink are at least a threshold amount (TH). In this case, the CPU 110 prints the partial image PI by rendering black in regions corresponding to first and second target pixels P1 and P2 in the partial image PI using CMY ink, while rendering black in regions corresponding to pixels other than first and second target pixels P1 and P2 using K ink and not CMY ink. This method can reduce the usage of K ink per unit time, preventing the need to provide other means for avoiding delays in ink supply, such as introducing a standby period. Hence, the method of the invention suppresses delays in the delivery of K ink without increasing printing time, thereby suppressing a decline in the quality of the printed image.

Further, regions in a partial image P1 corresponding to the first and second target pixels P1 and P2 and regions corresponding to pixels other than the first and second target pixels P1 and P2 are all printed in a single main scan. Accordingly, the method of the disclosure can reliably suppress delays in the supply of K ink for each individual main scan. Thus, there is no need to provide standby periods or the like between two successive main scans in order to avert a delay in the supply of K ink, thereby suppressing a decline in the quality of the partial image PI without increasing printing time, for example.

In the embodiment described above, the CPU 110 calculates the sum Tk of K component values in a partial image P1 (S130 of FIG. 3) as an index for the usage of K ink required to print the partial image P1. The CPU 110 determines whether there is a relative high potential for a delay in the delivery of K ink (S135 of FIG. 3) based on whether the sum Tk is greater than the K ink allowable amount Mk, serving as the threshold value. Since the CPU 110 can accurately determine whether there is a high potential for delay occurring in the delivery of K ink, the CPU 110 can reliably suppress such delays.

Since delays in ink delivery are more likely to occur when the viscosity of ink is high, the occurrence of such delays is more likely when the temperature Td in the MFP 100 is low. In the present embodiment, the K ink allowable amount Mk serving as a threshold value is set to a suitable value based on the temperature Td in the MFP 100 (S120 of FIG. 3). As a result, the CPU 110 can accurately determine whether the potential for delays occurring in the delivery of K ink is relatively high.

As shown in FIG. 6, the first replacement ratio RR1 is set to a value greater than 0 when the sum Tk is greater than the K ink allowable amount Mk, which is an example of the first threshold value. Therefore, the first replacement process is performed when the sum Tk is greater than the K ink allowable amount Mk. In other words, the CPU 110 prints images in regions corresponding to the first target pixels P1 by rendering black using both K ink and CMY ink when the sum Tk is greater than the K ink allowable amount Mk. Further, the second replacement ratio RR2 is set to a value greater than 0 when the sum Tk is greater than the threshold THa, which is an example of the second threshold value. Therefore, the second replacement process is performed when the sum Tk is greater than the threshold THa. In other words, the CPU 110 prints images in regions corresponding to the second target pixels P2 by rendering black colors using CMY ink rather than K ink when the sum Tk is greater than the threshold THa. As a result, the CPU 110 can appropriately change the ink used for printing regions corresponding to pixels targeted for replacement based on the sum Tk.

When rendering black using both K ink and CMY ink, the degree in which usage of K ink can be decreased is relatively small, but the usage of CMY ink can be kept relatively small due to the amount of K ink usage. Accordingly, image quality does not fluctuate much from normal printing using only K ink. Further, when rendering black using CMY ink but not K ink, the degree that the usage of K ink can be reduced is relatively high, but usage of CMY ink becomes relatively large due to the degree in which K ink is not used. Accordingly, image quality may fluctuate greatly from that during normal printing using only K ink. In the present embodiment, the replacement process used in the printing process changes in stages from the first replacement process to the second replacement process as the sum Tk grows larger, i.e., as the required reduction in K ink increases. This technique suppresses fluctuations in the quality of the printed image while avoiding delays in the supply of K ink.

Further, if it is not possible to render black using CMY ink, and specifically when the residual quantity of ink in one of the CMY colors is less than the threshold TH (S140: NO in FIG. 3), the CPU 110 reduces the number of main scan lines in the partial image PI having a sum Tk greater than the K ink allowable amount Mk until the sum Tk becomes less than or equal to the K ink allowable amount Mk (S165 in FIG. 3). The CPU 110 does not modify the number of main scan lines in the partial image PI when the sum Tk is less than or equal to the K ink allowable amount Mk (S135: NO in FIG. 3). In this way, the CPU 110 can reduce the required usage of K ink for printing a single partial image PI, even when black cannot be rendered with CMY ink. Since a slight amount of time elapses before the next partial image PI is printed, a delay in the delivery of ink can be resolved during this time. Thus, the disclosure can suppress a drop in the quality of the printed image, even when black cannot be rendered using CMY ink. Further, since the number of main scan lines in the partial image PI is modified only when the sum Tk is greater than the K ink allowable amount Mk and not when the sum Tk is less than or equal to the K ink allowable amount Mk, the method of the disclosure can prevent the printing time from becoming excessively long.

Figure 8A:
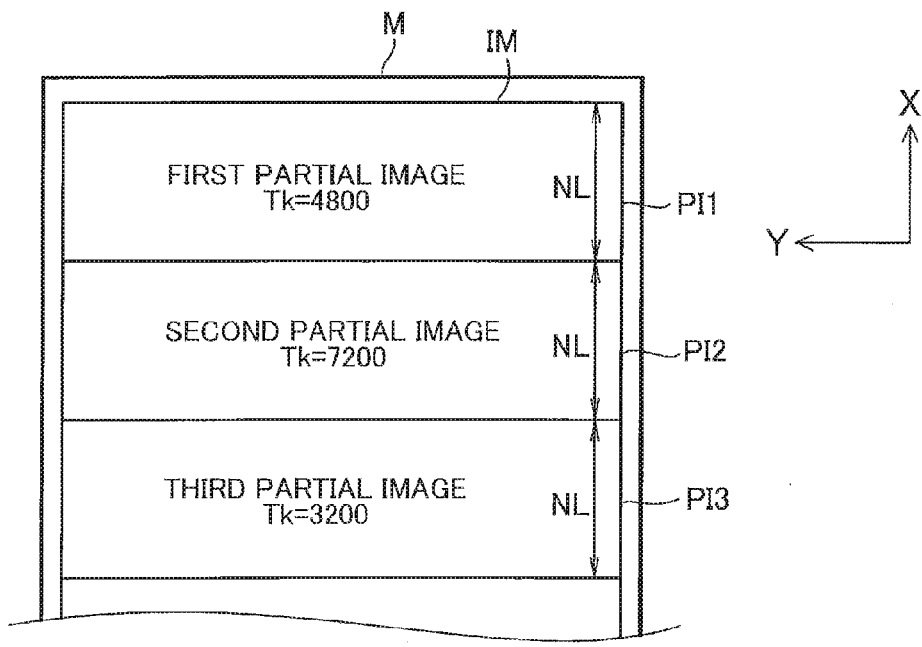
Figure 8B:
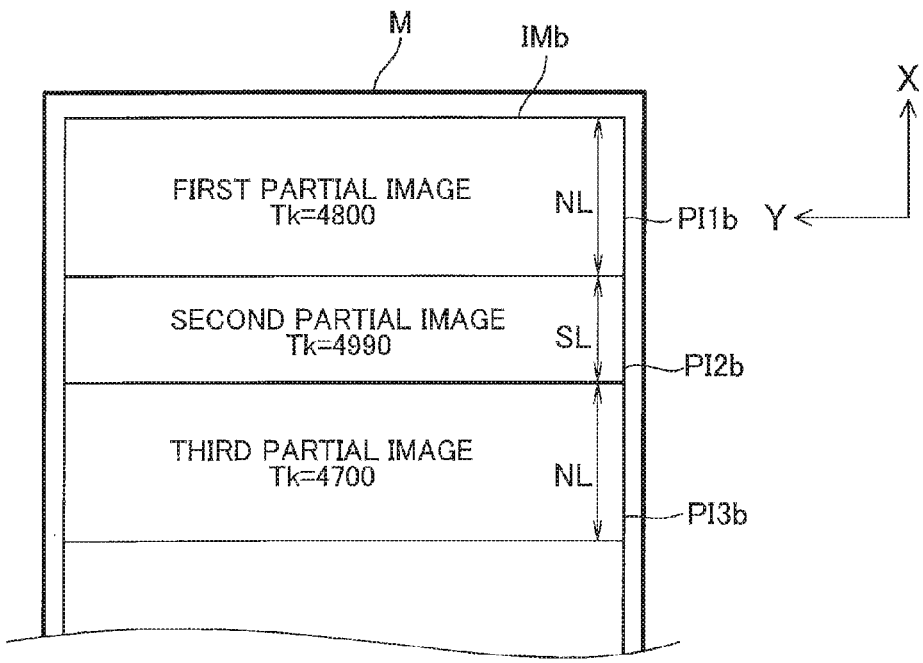

FIGS. 8A and 8B are explanatory diagrams illustrating modifications in the number of main scan lines. FIG. 8A shows a specific target image IM printed on a sheet M when the K ink allowable amount Mk is 10,000. In the example of FIG. 8A, the sum Tk of K component values for each of first through third partial images PI1-PI3 in the target image IM is 4,800, 7,200, and 3,200, respectively, all of which are less than or equal to the K ink allowable amount Mk. In this case, the number of main scan lines is not modified for any of the first through third partial images PI1-PI3. Accordingly, the dimension of the first through third partial images PI1-PI3 in the X-direction for the example in FIG. 8A is left at the initial value, which is the nozzle length NL.

FIG. 8B shows a target image IMb printed on a sheet M using the same target image data as in the example of FIG. 8A when the K ink allowable amount Mk is 5,000. In this case, the first partial image PI1b among first through third partial images PI1b-PI3b in the target image IMb is identical to the partial image PH in FIG. 8A. However, the second partial image PI2b differs from the second partial image PI2 in FIG. 8A in that the number of main scan lines has been reduced in order that the sum Tk of K component values is less than or equal to the K ink allowable amount Mk (5,000). Consequently, the dimension of the second partial image PI2b in the X-direction is a width SL, which is shorter than the nozzle length NL. The number of main scan lines in the third partial image PI3b is not modified since the sum Tk of K component values is less than or equal to 5,000. Accordingly, the dimension of the third partial image PI3b in the X-direction is equivalent to the nozzle length NL. By selectively reducing the number of main scan lines only in those partial images PI of the image whose sum Tk of K component values is greater than the K ink allowable amount Mk in this way, it is possible to perform fewer main scanning processes than when reducing the number of main scan lines in all partial images, for example. Thus, the method of the preferred embodiment can suppress delays in the supply of K ink without excessively increasing printing time.

As should be clear from the above description, regions in a partial image PI printed on a sheet M that correspond to the first and second target pixels P1 and P2 are examples of the second regions, while regions that correspond to pixels other than the first and second target pixels P1 and P2 are examples of the first regions.

B. Second Embodiment

FIG. 9 is a flowchart illustrating steps in a printing process according to the second embodiment of the present disclosure. In the second embodiment, steps S145-S155 of FIG. 3 according to the first embodiment are replaced with steps S145B and S150B in FIG. 9. All remaining steps in FIG. 9 are identical to those with the same step numbers in FIG. 3.

In S145B the CPU 110 analyzes the partial image data representing the target partial image to identify text regions that include text, and non-text regions that include objects other than text (photographs and line drawings, for example).

Any of various methods known in the art may be used to detect text regions and non-text regions in the target partial image. For example, the target partial image may be divided into a plurality of process regions (rectangular regions of a prescribed size, for example), and the CPU 110 may calculate the variance of pixel values (luminance values, for example) for each process region. The CPU 110 then identifies process regions having a smaller variance than a prescribed threshold value as text regions, and process regions having a variance greater than or equal to the threshold value as non-text regions. Here, other information, such as the number of colors used in each process region, may be used for identifying regions instead of variance. Alternatively, text regions may be identified in a character recognition process using a well-known optical character recognition (OCR) technique.

Figure 10A:
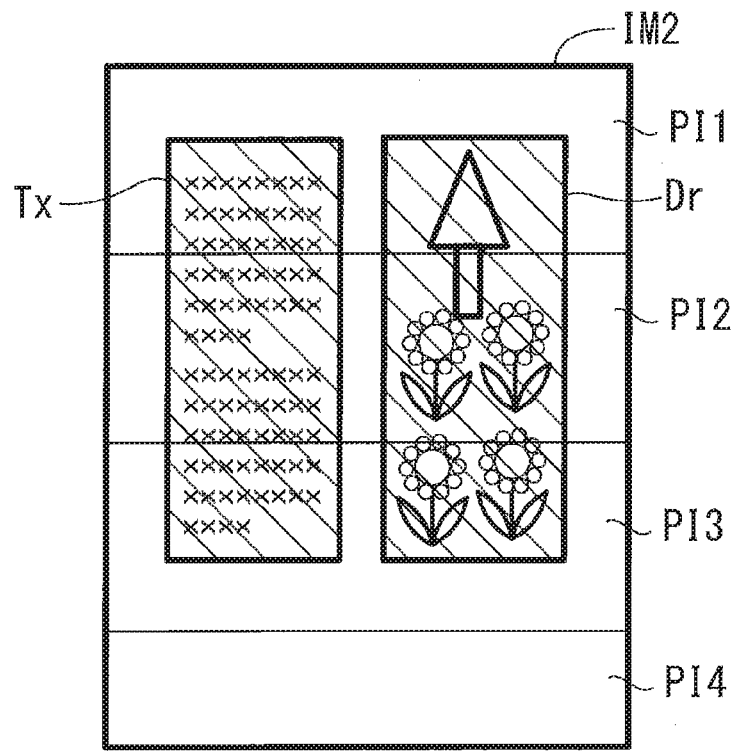
Figure 10B:
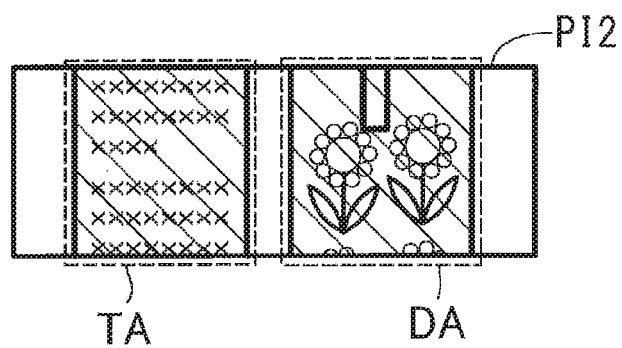

FIGS. 10A and 10B each shows an example of a target image IM2. As shown in FIG. 10A, the target image IM2 includes a text region Tx that includes text, and a non-text region Dr depicting a line drawing. Accordingly, the plurality of partial images PI1-PI4 selected when printing the target image IM2 may each include a portion of the text region Tx and a portion of the non-text region Dr. Thus, when the second partial image PI2 shown in FIG. 10B of the target image IM2 is set as the target partial image, in S145B the CPU 110 identifies a text region TA and a non-text region DA in the second partial image PI2, as illustrated in FIG. 10B.

In S150B the CPU 110 sets a plurality of pixels in the non-text region as target replacement pixels. Here, a plurality of pixels in the non-text region may be set as first target pixels P1 or may be set as second target pixels P2. Alternatively, some of the pixels among the plurality of pixels in the non-text region selected to be replacement pixels may be set as first target pixels P1, while some of the remaining pixels selected as replacement pixels may be set as second target pixels P2.

According to the second embodiment described above, regions in which black is printed using CMY ink, i.e., regions corresponding to the first and second target pixels P1 and P2 are the non-text regions, while regions in which black is printed using K ink and not CMY ink, i.e., regions corresponding to pixels other than the first and second target pixels P1 and P2 are the text regions. By setting appropriate target replacement pixels according to the type of object in the target partial image, the CPU 110 can further suppress a decline in the quality of the printed image resulting from the replacement process performed in S160.

More specifically, edges tend to be depicted with greater sharpness when black is rendered using only K ink and with less sharpness when black is rendered using CMY ink. Text is more legible and has a better appearance when the edges are sharper. Therefore, from the perspective of image quality, it is preferable to print text regions using only K ink. For photographs and drawings, color gradations rather than edge clarity is more important from the perspective of image quality than for text. Hence, there is less need to print black in non-text regions using only K ink and, depending on the image, it may be preferable from the perspective of image quality to render black using CMY ink. Therefore, in the second embodiment non-text regions are set as regions in which black is to be rendered using CMY ink, while text regions are regions in which black is to be rendered using only K ink rather than CMY ink, as described above. Accordingly, the present disclosure can further suppress a decline in the quality of the printed image resulting from the replacement process performed in S160.

C. Variations of the Embodiments (1) In the embodiments described above, the CPU 110 determines whether the potential for a delay in the supply of ink occurring is relatively high based on whether the sum Tk of K component values in the partial image PI is greater than a K ink allowable amount Mk determined based on the temperature Td in the MFP 100. However, the CPU 110 may instead determine whether the potential for a delay in ink supply is relatively high based on whether the temperature Td in the MFP 100 is less than or equal to a reference value, for example. Since it is possible to perform appropriate control based on the temperature Td in the MFP 100 (i.e., the temperature of the print execution unit 200), this method can suppress delays in ink delivery. For example, the CPU 110 may determine that the potential for a delay in ink delivery is relatively high when the temperature Td in the MFP 100 is less than or equal to a predetermined reference value and the sum Tk of K component values in the partial image PI is greater than or equal to a predetermined reference value.

Alternatively, the CPU 110 may determine whether the potential for a delay in ink delivery is relatively high based solely on the temperature Td in the MFP 100. For example, the CPU 110 may determine that the potential for a delay in ink delivery is relatively high when the temperature Td in the MFP 100 is less than or equal to a predetermined reference value and may execute the replacement process in S160 on a predetermined percentage of pixels. In this case, if the temperature Td in the MFP 100 is greater than the predetermined reference value, the CPU 110 determines that the potential for a delay in ink delivery is relatively low and does not execute the replacement process of S160.

Further, rather than using the temperature Td and K ink allowable amount Mk, a viscosity sensor may be mounted in the ink cartridge for directly measuring the viscosity of ink. In this case, the CPU 110 may determine that the potential for a delay in ink delivery is relatively high when the detected viscosity of ink is relatively high and that the potential for a delay is relatively low when the detected viscosity is relatively low.

(2) In the embodiments described above, the CPU 110 determines for each partial image PI whether the potential for a delay in the delivery of ink is relatively high. However, the CPU 110 may instead make this determination for the entire target image. For example, the CPU 110 may determine whether the potential for a delay in ink delivery is relatively high based on whether the sum of K component values in the entire target image is greater than an allowable amount. In this case, if the CPU 110 determines that the potential for a delay in ink delivery is relatively high, the CPU 110 may set first and second target pixels P1 and P2 to be distributed evenly throughout the entire target image. Note that this configuration may be employed even when the print execution unit 200 is a line printer, i.e., a print execution unit of a type that does not perform main scans.

(3) In the embodiments described above, the CPU 110 prints partial areas of a target partial image using CMY ink to render black when the potential for a delay in the delivery of black ink (K ink) is relatively high. However, in a control device for controlling a print execution unit that uses ink in the colors gray, light cyan, light magenta, and light yellow in addition to the colors C, M, Y, and K, the print execution unit may print partial regions of the target partial image using light cyan, light magenta, and light yellow inks to render gray when the potential for a delay in the delivery of gray ink is determined to be relatively high. In addition, in a control device for controlling a print execution unit that uses a plurality of types of ink including a pigment-based K ink suited to the printing of text and a dye-based K ink suited to the printing of photographs and the like, the print execution unit may print partial regions of the target partial image using the pigment-based K ink to render black when determining that the potential for a delay in the delivery of dye-based K ink is relatively high. In general, the control device may control the print execution unit to print partial regions of a target partial image using a type of ink that differs from a specific type to render the color of the specific type of ink when determining that the potential for a delay in the delivery of the specific type of ink is relatively high compared to the other types of ink.

(4) In the present embodiments described above, the sum Tk of K component values in a target partial image is used as an index for the usage of K ink required to print the target partial image. However, the sum of dots formed in K ink when printing the target partial image without performing the replacement process may be used as an index for the usage of K ink.

(5) Instead of using the temperature Td in the MFP 100 to set the K ink allowable amount Mk, the CPU 110 may set the K ink allowable amount Mk using the temperature of ink in the ink cartridges CTG or the temperature of ink in ink channels, such as the tubes 252, for example. In general, the temperature should be detected in at least some part of the print execution unit 200.

(6) Rather than performing the determination in S140, the CPU 110 may determine whether to execute the replacement process of S160 or the process in S165 based on the type of paper being printed. For example, the CPU 110 may be configured to execute a replacement process that replaces pigment-based K ink with dye-based K ink for rendering black. Here, since pigment-based K ink and dye-based K ink permeate paper differently, the CPU 110 may execute the process in S165 when using a first type of paper that has a relatively high potential for adversely affecting image quality, and may execute the replacement process of S160 when using a second type of paper having a relatively low potential for adversely affecting image quality.

(7) In the second embodiment, the CPU 110 identifies text regions and non-text regions for each partial image PI. However, the CPU 110 may instead identify text regions and non-text regions in the entire target image by analyzing the target image data as a whole. Further, rather than identifying text regions and non-text regions, the CPU 110 may identify regions containing relatively small text and regions containing relatively large text. Next, the CPU 110 may set a plurality of pixels in the regions containing relatively large text as target pixels for replacement since relatively small text would be difficult to read if the sharpness of its edges were reduced, while relatively large text remains legible even when the sharpness of its edges is reduced.

(8) In the embodiments described above, the CPU 110 of the MFP 100 executes the printing process in FIG. 3. However, the CPU of the PC 400 may be used to execute the printing process in FIG. 3. In this case, a printer driver program is installed on the PC 400, and the CPU of the personal computer 400 implements the printing process in FIG. 3 by executing the printer driver program, for example. In this case, in S120 of FIG. 3 the CPU of the PC 400 may communicate with the MFP 100 and acquire the temperature Td in the MFP 100 from the same. In S175 and S185 of FIG. 3, the CPU of the personal computer 400 controls the MFP 100 to execute main scanning processes and sub scanning processes by transmitting dot data and prescribed printing commands to the MFP 100.

(9) While the target image data in the embodiments described above is facsimile data, i.e., binary image data, the target image data may be image data containing grayscale values or other intermediate gradations, for example. Alternatively, the target image data may be normal RGB image data. When the image data used for printing represents a business document containing objects primarily depicted in black with some color, for example, delays in the delivery of K ink are more likely to occur. Thus, the effects of applying the printing process in FIG. 3 will be more profound.

(10) In the embodiments described above, part of the configuration implemented in hardware may be replaced with software and, conversely, part of the configuration implemented in software may be replaced with hardware. For example, a dedicated hardware circuit containing logic circuits may be provided to implement all or part of the printing process executed by the CPU 110 (see FIG. 3).

While the description has been made in detail with reference to specific embodiments thereof, it would be apparent to those skilled in the art that many modifications and variations may be made therein without departing from the spirit of the above described embodiments, the scope of which is defined by the attached claims.

What is claimed is:

1. A control device for controlling a printer comprising:
a print head having a plurality of sets of nozzles, each of the plurality of sets of nozzles being configured to eject ink in one of a plurality of colors, the plurality of colors including a specific color and a plurality of different colors different from the specific color, the control device comprising:
a controller configured to perform:
acquiring target image data representing a target image, the target image including a first image within a first region and a second image within a second region;
calculating an index value indicative of an amount of ink in the specific color to be used in printing at least a part of the target image;
determining whether the index value is greater than a threshold value;
in response to determining that the index value is not greater than the threshold value, controlling the printer to print the first image and the second image using the ink in the specific color but not using inks in the plurality of different colors for reproducing the specific color; and
in response to determining that the index value is greater than the threshold value, controlling the printer to print the first image using the ink in the specific color but not using the inks in the plurality of different colors for reproducing the specific color and to print the second image using a combination of the inks in the plurality of different colors for reproducing the specific color.

2. The control device according to claim 1, wherein the threshold value includes a first threshold value and a second threshold value greater than the first threshold value;
wherein when the index value is greater than the first threshold value and smaller than or equal to the second threshold value, the second image is printed using both of the ink in the specific color and the combination of the inks in the plurality of different colors for reproducing the specific color; and
wherein when the index value is greater than the second threshold value, the second image is printed not using the ink in the specific color but using the combination of the inks in the plurality of different colors for reproducing the specific color.

3. The control device according to claim 1, wherein the printer further comprises:

a main scanner configured to perform a main scan to move the print head relative to a printing medium along a main scanning direction; and
a sub scanner configured to perform a sub scan to move the printing medium relative to the print head along a sub scanning direction perpendicular to the main scanning direction;
wherein the target image is divided into a plurality of partial images, each of the plurality of partial images including the first image within the first region and the second image within the second region; and
wherein the printer is configured to drive the print head to print each of the plurality of partial images onto the printing medium during performing one main scan.

4. The control device according to claim 3, wherein each of the plurality of partial images has a width in the sub scanning direction;
wherein the calculating calculates the index value for each of the plurality partial images;
wherein the determining determines whether the index value for each of the plurality of partial images is greater than the threshold value; and
wherein the controller is further configured to perform:
determining whether the combination of the inks in the plurality of different colors can reproduce the specific color;
in response to determining that the index value for one of the plurality of partial images is greater than the threshold value and determining that the combination of the inks in the plurality of different colors cannot reproduce the specific color, reducing the width of the one of the plurality of partial images so that the index value becomes smaller than the threshold value; and
in response to determining that the index value for another of the plurality of partial images is smaller than or equal to the threshold value, controlling the printer to print the second image using the combination of the inks in the plurality of different colors without changing the width of the another of the plurality of partial images.

5. The control device according to claim 1, wherein the controller is further configured to perform:
identifying a region including a first object as the first region and a region including a second object as the second region in the target image.

6. The control device according to claim 1, further comprising a temperature sensor configured to sense a temperature of the printer, wherein the controller is further configured to perform acquiring the temperature of the printer;
wherein the controller is further configured to control the printer to print the second image using the combination of the inks in the plurality of different colors when the temperature is less than or equal to a reference temperature.

7. The control device according to claim 1, wherein when the index value is greater than the threshold value, the second image is printed not using the ink in the specific color but using the combination of the inks in the plurality of different colors for reproducing the specific color.

8. The control device according to claim 1, wherein when the index value is greater than the threshold value, the second image is printed using both of the ink in the specific color and the combination of the inks in the plurality of different colors for reproducing the specific color.

9. The control device according to claim 1, wherein the specific color is black.

10. The control device according to claim 1, wherein the plurality of different colors includes cyan, magenta, and yellow.

11. A non-transitory computer readable storage medium storing a set of program instructions for a control device for controlling a printer, the printer comprising:
a print head having a plurality of sets of nozzles, each of the plurality of sets of nozzles being configured to eject ink in one of a plurality of colors, the plurality of colors including a specific color and a plurality of different colors different from the specific color, the control device comprising a controller, the set of program instructions, when executed by the controller, causing the control device to perform:
acquiring target image data representing a target image, the target image including a first image within a first region and a second image within a second region;
calculating an index value indicative of an amount of ink in the specific color to be used in printing at least a part of the target image;
determining whether the index value is greater than a threshold value;
in response to determining that the index value is not greater than the threshold value, controlling the printer to print the first image and the second image using the ink in the specific color but not using inks in the plurality of different colors for reproducing the specific color; and
in response to determining that the index value is greater than the threshold value, controlling the printer to print the first image using the ink in the specific color but not using the inks in the plurality of different colors for reproducing the specific color and to print the second image using the inks in the plurality of different colors for reproducing the specific color.

12. The non-transitory computer readable storage medium according to claim 11, wherein the threshold value includes a first threshold value and a second threshold value greater than the first threshold value;
wherein when the index value is greater than the first threshold value and smaller than or equal to the second threshold value, the second image is printed using both of the ink in the specific color and the combination of the inks in the plurality of different colors for reproducing the specific color; and
wherein when the index value is greater than the second threshold value, the second image is printed not using the ink in the specific color but using the combination of the inks in the plurality of different colors for reproducing the specific color.

13. The non-transitory computer readable storage medium according to claim 11, wherein the printer further comprises:
a main scanner configured to perform a main scan to move the print head relative to a printing medium along a main scanning direction; and
a sub scanner configured to perform a sub scan to move the printing medium relative to the print head along a sub scanning direction perpendicular to the main scanning direction;
wherein the target image is divided into a plurality of partial images, each of the plurality of partial images including the first image within the first region and the second image within the second region; and
wherein the printer is configured to drive the print head to print each of the plurality of partial images onto the printing medium during performing one main scan.

14. The non-transitory computer readable storage medium according to claim 13, wherein each of the plurality of partial images has a width in the sub scanning direction;
- wherein the calculating calculates the index value for each of the plurality partial images;
- wherein the determining determines whether the index value for each of the plurality of partial images is greater than the threshold value; and
- wherein the set of program instructions, when executed by the controller, causes the control device to further perform:
  - determining whether the combination of the inks in the plurality of different colors can reproduce the specific color;
  - in response to determining that the index value for one of the plurality of partial images is greater than the threshold value and determining that the combination of the inks in the plurality of different colors cannot reproduce the specific color, reducing the width of the one of the plurality of partial images so that the index value becomes smaller than the threshold value; and
  - in response to determining that the index value for another of the plurality of partial images is smaller than or equal to the threshold value, controlling the printer to print the second image using the combination of the inks in the plurality of different colors without changing the width of the another of the plurality of partial images.

15. The non-transitory computer readable storage medium according to claim 11, wherein the set of program instructions, when executed by the controller, causes the control device to further perform:
- identifying a region including a first object as the first region and a region including a second object as the second region in the target image.

16. The non-transitory computer readable storage medium according to claim 11, wherein the control device further comprises a temperature sensor configured to sense a temperature of the printer,
- wherein the set of program instructions, when executed by the controller, causes the control device to further perform:
  - acquiring the temperature of the printer; and
  - controlling the printer to print the second image using the combination of the inks in the plurality of different colors when the temperature is less than or equal to a reference temperature.

17. The non-transitory computer readable storage medium according to claim 11, wherein when the index value is greater than the threshold value, the second image is printed not using the ink in the specific color but using the combination of the inks in the plurality of different colors for reproducing the specific color.

18. The non-transitory computer readable storage medium according to claim 11, wherein when the index value is greater than the threshold value, the second image is printed using both of the ink in the specific color and the combination of the inks in the plurality of different colors for reproducing the specific color.

19. The non-transitory computer readable storage medium according to claim 11, wherein the specific color is black.

20. The non-transitory computer readable storage medium according to claim 11, wherein the plurality of different colors includes cyan, magenta, and yellow.

* * * * *